Oct. 6, 1925.
Y. A. DYER
1,556,316
METHOD OF REDUCING OXIDE ORES TO METALLIC STATE
Filed March 10, 1924
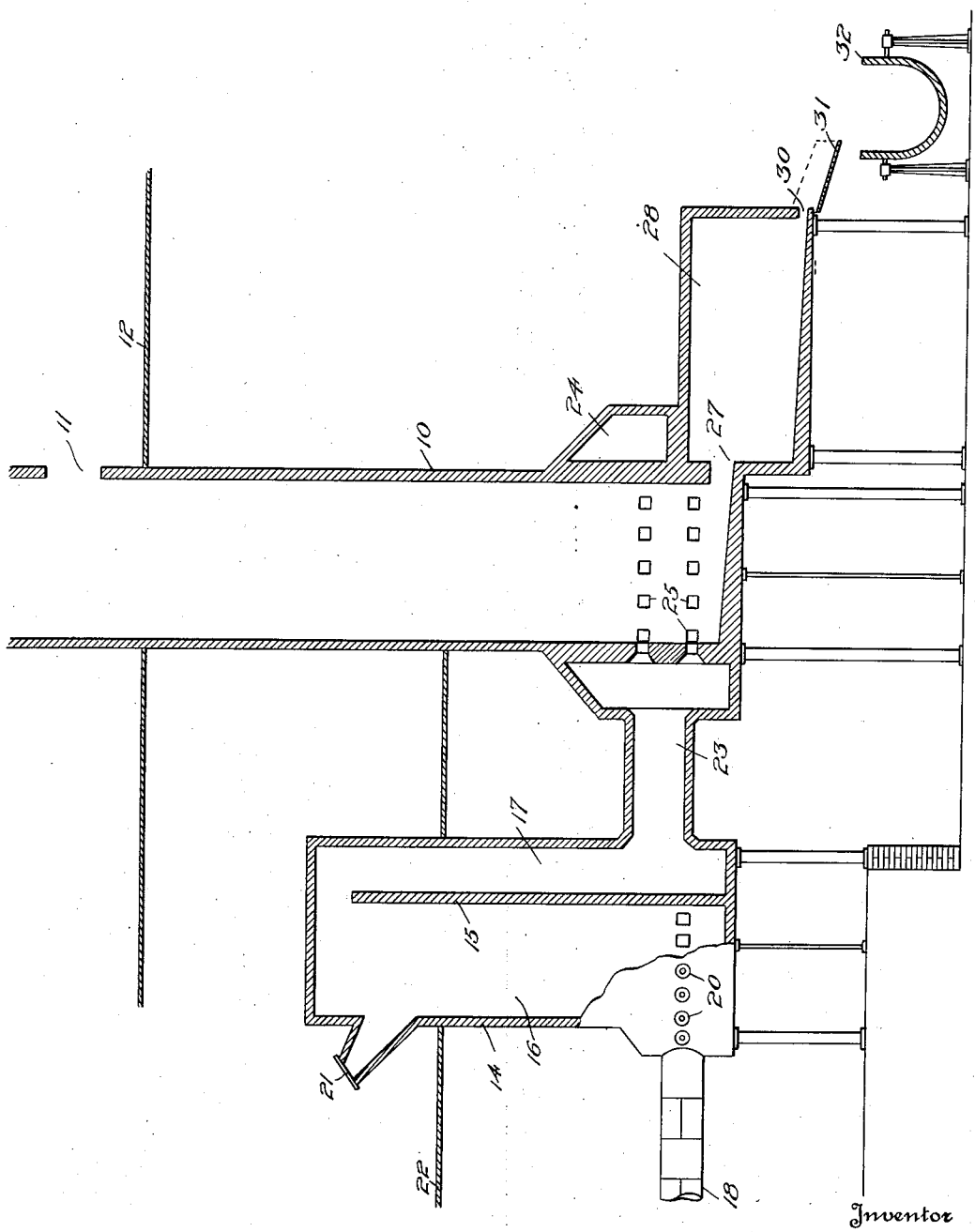

Patented Oct. 6, 1925.

1,556,316

UNITED STATES PATENT OFFICE.

YULEE ALISON DYER, OF BIRMINGHAM, ALABAMA.

METHOD OF REDUCING OXIDE ORES TO METALLIC STATE.

Application filed March 10, 1924. Serial No. 698,153.

*To all whom it may concern:*

Be it known that I, YULEE ALISON DYER, a citizen of the United States, residing at Birmingham, in the county of Jefferson and State of Alabama, have invented certain new and useful Improvements in Methods of Reducing Oxide Ores to Metallic State; and I do hereby declare the following to be a full, clear, and exact description of the same, reference being had to the accompanying drawing, forming part of this specification.

This invention relates to a method of reducing various substances from their natural oxide state to subsequent metallic state by primarily combusting the fuel to $CO_2$ (carbon dioxide) gas in a separate and detached chamber and passing the gas over into a second chamber, or furnace (containing oxide ore and carbonaceous material) for secondary combustion to CO (carbon monoxide) gas to deoxidize the ore.

In practicing the invention the carbonaceous material is practically burned to carbon dioxide gas in a chamber adjacent to reducing furnace, the carbon dioxide gas being forced by mechanical pressure from gas chamber underneath relatively thin beds of carbonaceous material which is alternately placed between ore charges in reducing furnace. By this process of operation the carbon dioxide gas, in passing through a gauged carbonaceous fuel bed, is converted to carbon monoxide gas to completely deoxidize a gauged charge of oxide ore. When the ore charge shall have been completely deoxidized the fuel bed below the charge will have been exhausted in toto by passing into gas and slag, then the stream of primary carbon dioxide gas from chamber will play on and melt the "metallic sponge." When sponge shall have been melted and passes to forehearth attached to furnace an intermediate charge of carbonaceous material will have worked itself to the hearth, and again carbon monoxide reaction will be set up for deoxidizing ore charge above, and so on throughout operations.

In practicing my invention the intense heat of primary combustion is accomplished outside of reducing furnace, and only (1) reducing and (2) melting are done in the furnace in contradistinction to (1) primary combustion, (2) reducing and (3) melting in the present-day blast furnace, thereby eliminating the major portion of the immense bosh coke bed which is necessary (in present-day blast furnace practice) to cool the temperature in reducing zones to the most effective ratio between $CO_2/CO$ gases in contact with oxide ore.

In practicing my invention there will not only be a material saving in coke consumption by eliminating major portion of bosh coke bed, but there will be a coke saving by minimizing "solution loss" of carbon. That is: maximum reduction will be accomplished by carbon monoxide gas and practically no reduction by solid carbon of fuel.

In practicing my invention there will be an increased yield of metallic content per area of furnace unit by reason of primary fuel bed being in separate chamber, thereby supplying a larger area in furnace for ore charges.

In practicing my invention the necessity for excessively high furnace shafts will be eliminated, thereby eliminating excessive driving and high pressures—which, in turn, decreases gas velocity. Lower gas velocities mean more complete deoxidation by carbon monoxide gas by reason of relatively longer time in contact with the oxide ore. Lower gas velocities also mean decreased blowing power, and decreased blowing power means decreased boiler power.

The process may be carried out in various types of apparatus and the form shown in the figure is illustrative only, the figure being highly diagrammatic. The figure is a general cross section partly in side elevation through the combustion chamber, cupola, forehearth and ladle.

The cupola furnace 10 is of the usual high type and the ore, limestone and coke are fed in through the charging door 11, or top of stack in any desired manner—a standard charging floor 12 being provided; or a skip-hoist or usual tophouse for top filling.

The primary gas chamber 14 is of any desired size and shape, and is provided with a vertical baffle wall 15 separating the chamber into a major portion 16 in which carbonaceous or other material or fuel is burned, and a much smaller passageway 17 down which the burned gases are forced by mechanical blower delivering natural air, or air preheated by a waste gas recuperator, to a main 18 connected to the bottom of the portion 16 of the combustion chamber through tuyères 20. Carbonaceous material is fed in through inlet 21 located at a convenient distance above coke charging floor 22, feeding of the coke being preferably automatic through well known mechanism, or by gravity.

As the gas formed by the combustion of carbonaceous material passes down the portion 17 it is fed through the relatively small passageway 23 into gas belt 24 entirely or partially surrounding bottom of the furnace 10, and being connected with it by a plurality of gas ports 25 located quite near the bottom or hearth of furnace which is sloped downwardly towards its open taphole 27 leading to forehearth 28. The forehearth 28 may be provided with a taphole as at 30 constantly or intermittently opened to deliver the liquid iron or other metal to the trough 31 and thence to ladle 32, or into pig beds.

The operation is as follows: The ore to be reduced, intermediate coke for fuel and limestone for flux alternately fill the furnace from bottom to a desired height, and the carbon dioxide gas impinges on and through a thin bed of carbonaceous fuel, which is always intermediate between ore charges, and is converted to carbon monoxide gas (thereby lowering temperature) which deoxidizes ore charge above it. When bottom coke charge burns away the "metallic sponge" then comes in direct contact with intensely hot carbon dioxide gas from chamber, is melted and passes to forehearth, thereby permitting next charge of coke to pass to the hearth for reaction with carbon dioxide gas.

In ordinary blast furnace practice the hearth or tuyère zone coke bed in the furnace is combusted by oxygen of the air, and due to the intense heat of primary combustion within the single-unit furnace the gas has to pass up through another immense bosh bed of coke to convert it to carbon monoxide gas and to cool the zone of reduction to a comparatively low temperature for effective deoxidation work. Inasmuch as the primary combustion is done in such a one-unit chamber, under high pressure and gas velocity, the bosh coke bed is forced high, consequently there has to be a high shaft provided to receive sufficient ore for an economic metallic yield. These high units (bosh and shaft) consequently increase pressure and gas velocity to the extent that present-day average furnace practice—quoting from a paper by Sperr and Jacobson—shows that "the original oxygen in the iron oxide removed by carbon monoxide gas is 71.4% maximum and 42.4% minimum." This means that the balance of oxygen from the ore has to be removed by the expensive method of "solid carbon" reduction, and is due to the fact that temperatures are too high in deoxidizing zones and gas velocities are too high for effective period contact with the ore.

What I claim is:

1. A process of reducing oxide ores which consists in arranging a layer of the ore to be reduced on a thin-gauged bed of carbonaceous material, generating carbon dioxide gas from a separate body of carbonaceous material, and flowing the carbon dioxide gas to the bed of carbonaceous material and from the bottom to the top thereof, thereby converting said carbon dioxide gas to carbon monoxide gas for reducing the layer of ore above, whereby primary combustion of carbonaceous material in the presence of the ore is eliminated.

2. The process if reducing oxide ores and melting the resulting iron-sponge in a chamber without creating primary combustion in said chamber, which consists in arranging layers of the material to be treated and alternate thin-gauged beds of carbonaceous material in said chamber, with a bed of the latter always being on the bottom of the entire mass during the reducing process, flowing carbon dioxide gas to the lower exposed face of the bed of carbonaceous material thereby secondarily converting said carbonaceous material to carbon monoxide in said chamber to reduce the ore and, at the same time, converting said bed of carbonaceous material to slag which passes out of the furnace and then continuing the flow of carbon dioxide to the succeeding layer of reduced ore or iron-sponge until it is melted.

3. A continuous process of reducing oxide ores which consists in generating carbon dioxide gas at one point, flowing it to a chamber and there passing it from the bottom to the top of a thin-gauged bed of carbonaceous material to convert said carbonaceous material to carbon monoxide gas in said chamber, and then passing said carbon monoxide gas through a layer of ore superimposed on said thin-gauged bed of carbonaceous material, whereby primary combustion of carbonaceous material in the presence of the ore is rendered nil.

4. A continuous and automatic process of reducing oxide ores which consists in generating carbon dioxide gas at one point, flowing it to a chamber under mechanical pressure and there passing it from the bottom to the top of a thin-gauged bed of carbonaceous material to convert said carbonaceous material to carbon monoxide gas in said chamber, and then automatically passing said carbon monoxide gas through a layer of ore superimposed on said thin-gauged bed of carbonaceous material, whereby primary combustion of carbonaceous material in the presence of the ore is rendered nil.

5. The process of continuously and automatically reducing and melting oxide ores, which consists in superimposing layers of ore to be treated on thin-gauged beds of carbonaceous material in a suitable furnace chamber, primarily generating carbon dioxide gas in a separate chamber at a remote point from a mass of carbonaceous material and continuously and automatically passing said carbon dioxide gas to the bottom of the alternate layers of carbonaceous material in the furnace chamber, said gas being secondarily converted to carbon monoxide gas in said chamber by passing through a bed of carbonaceous material before coming in contact with a layer of ore.

6. The process of reducing oxide ores, which consists in placing in a furnace the ore to be smelted or reduced, generating carbon dioxide gas at a point remote from the furnace, passing said gas to the furnace and there automatically converting it to carbon monoxide.

7. The process of reducing oxide ores, which consists in placing in a furnace the ore to be smelted or reduced, generating carbon dioxide gas at a point remote from the furnace, passing said gas to the furnace and there converting it to carbon monoxide without the aid of primary combustion of carbon in proximity to the ore being smelted or reduced.

YULEE ALISON DYER.